(12) United States Patent
Otremba et al.

(10) Patent No.: US 10,480,234 B2
(45) Date of Patent: *Nov. 19, 2019

(54) APPARATUS AND METHOD OF PROVIDING FULL WINDOW OPENING ABOVE A DOOR INCLUDING A WINDOW AND A DIVISION BAR

(71) Applicant: FORD GLOBAL TECHNOLOGIES, LLC, Dearborn, MI (US)

(72) Inventors: Kyle Otremba, Farmington Hills, MI (US); Henry W. Hausler, South Lyon, MI (US); Donald P. Iacovoni, Plymouth, MI (US); Paul L. Heirtzler, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/499,321

(22) Filed: Apr. 27, 2017

(65) Prior Publication Data

US 2018/0313125 A1    Nov. 1, 2018

(51) Int. Cl.
| | |
|---|---|
| *E05F 15/08* | (2006.01) |
| *E05D 15/18* | (2006.01) |
| *E05D 15/16* | (2006.01) |
| *E05F 15/60* | (2015.01) |
| *B60J 1/17* | (2006.01) |
| *B60J 5/04* | (2006.01) |

(52) U.S. Cl.
CPC ............... *E05D 15/18* (2013.01); *B60J 1/17* (2013.01); *E05D 15/165* (2013.01); *E05F 15/60* (2015.01); *B60J 5/0416* (2013.01); *E05Y 2900/55* (2013.01)

(58) Field of Classification Search
CPC .......... E05D 15/18; E05D 15/165; B60J 5/04; B60J 5/00; B60J 5/0416; B60J 1/17; E05F 15/60; E05Y 2900/55
USPC .......................... 49/348, 349, 350, 351, 352
See application file for complete search history.

(56) References Cited

U.S. PATENT DOCUMENTS

| | | | | |
|---|---|---|---|---|
| 2,030,089 | A | * | 2/1936 | Anderson ............. E05F 11/382 296/96.11 |
| 2,122,963 | A | * | 7/1938 | Susor ......................... B60J 1/14 49/103 |
| 2,152,055 | A | * | 3/1939 | Kegler .................. E05F 11/382 49/103 |
| 2,253,805 | A | * | 8/1941 | Olivier .................. E05F 11/382 49/145 |

(Continued)

FOREIGN PATENT DOCUMENTS

WO      2011014684 A1      2/2011

OTHER PUBLICATIONS

Non final Office Action dated Dec. 6, 2018 for U.S. Appl. No. 15/499,321, filed Apr. 27, 2017.

(Continued)

*Primary Examiner* — Jerry E Redman
(74) *Attorney, Agent, or Firm* — Jason Rogers; Vichit Chea; King & Schickli, PLLC (57) ABSTRACT

An apparatus includes a door panel having a window receiver and an internal compartment, a window and a division bar. That regulator carried on the door panel displaces the window and division bar between a closed position projecting from the entry opening and an opened position fully concealed within the internal compartment of the door panel.

13 Claims, 11 Drawing Sheets

(56) References Cited

U.S. PATENT DOCUMENTS

| | | | | |
|---|---|---|---|---|
| 2,863,658 | A * | 12/1958 | Moyes | E05F 11/382 49/144 |
| 2,955,817 | A * | 10/1960 | Campbell | E05F 11/445 49/103 |
| 3,024,062 | A * | 3/1962 | Himka | E05F 15/689 296/155 |
| 3,659,381 | A * | 5/1972 | Frey | E05F 11/382 49/103 |
| 3,670,454 | A * | 6/1972 | Gebhard | E05F 11/382 49/103 |
| 3,733,748 | A * | 5/1973 | Heesch | E05F 11/382 49/103 |
| 3,745,703 | A * | 7/1973 | Francis | E05F 11/382 49/103 |
| 3,782,037 | A * | 1/1974 | Heesch | E05F 11/382 49/103 |
| 3,788,005 | A * | 1/1974 | Mistopoulos, Jr. | E05F 11/445 49/103 |
| 3,816,962 | A * | 6/1974 | Ladd | E05F 11/382 49/103 |
| 3,816,963 | A * | 6/1974 | Hartmeyer | E05F 11/382 49/103 |
| 3,859,753 | A * | 1/1975 | Marcuzzi | E05F 11/382 49/103 |
| 3,900,965 | A * | 8/1975 | Mummert | E05F 11/382 49/103 |
| 3,965,618 | A * | 6/1976 | Pickles | E05F 11/382 49/103 |
| 4,000,581 | A * | 1/1977 | Fukumoto | E05F 11/382 49/103 |
| 4,020,593 | A * | 5/1977 | Salomon | E05F 11/382 49/103 |
| 4,502,248 | A * | 3/1985 | Thomas, Jr. | B60J 1/17 49/374 |
| 4,571,888 | A * | 2/1986 | Jensen | E05C 17/60 49/374 |
| 4,776,630 | A * | 10/1988 | Fukutomi | B60J 7/028 296/107.17 |
| 4,811,517 | A * | 3/1989 | Eckert | B60J 1/14 49/103 |
| 6,419,295 | B1 * | 7/2002 | Neubrand | B60J 7/1286 296/107.07 |
| 6,729,672 | B2 * | 5/2004 | Neubrand | B60J 7/145 296/107.07 |
| 8,333,423 | B2 | 12/2012 | Gulker et al. | |
| 8,661,735 | B2 * | 3/2014 | Zellmer | B60J 1/14 296/146.2 |
| 8,727,419 | B2 * | 5/2014 | Syvret | B60J 1/17 296/146.2 |
| 8,827,027 | B2 | 9/2014 | Syvret et al. | |
| 9,033,394 | B2 | 5/2015 | Heirtzler et al. | |
| 9,903,147 | B2 * | 2/2018 | Rojas | B60J 1/17 |
| 2001/0020347 | A1 * | 9/2001 | de Gaillard | B60J 1/1861 49/374 |
| 2003/0052635 | A1 * | 3/2003 | Schindler | B60J 7/057 318/445 |
| 2003/0116994 | A1 * | 6/2003 | Richtor | B60J 1/12 296/146.16 |
| 2004/0194390 | A1 * | 10/2004 | Ishikawa | B60J 1/17 49/352 |
| 2006/0103047 | A1 | 5/2006 | Zwolinski | |
| 2008/0088152 | A1 | 4/2008 | Rietdijk | |
| 2011/0192088 | A1 * | 8/2011 | Zellmer | E05F 11/525 49/358 |
| 2015/0028620 | A1 | 1/2015 | Gerhardt et al. | |

OTHER PUBLICATIONS

Final Office Action dated May 13, 2019 for U.S. Appl. No. 15/499,441, filed Apr. 27, 2017.

* cited by examiner

APPARATUS AND METHOD OF PROVIDING FULL WINDOW OPENING ABOVE A DOOR INCLUDING A WINDOW AND A DIVISION BAR

TECHNICAL FIELD

This document relates generally to the motor vehicle equipment field and, more particularly, to a new and improved apparatus and method for fully lowering a window and a division bar and providing a full window opening above a door panel.

BACKGROUND

In motor vehicle applications, there are challenges with designing movable windows or door glass to drop inside of the door structure. Often, the shape of the lower door structure does not accommodate the complete lowering of a full door glass window using traditional automotive hardware systems. This is typically an issue on rear side doors, where the location of the rear wheel well might necessitate a certain shape and size of the lowered door structure that is smaller than desired, or on a front door with an outside rearview mirror that is not mounted above the belt line.

Figure 1A:
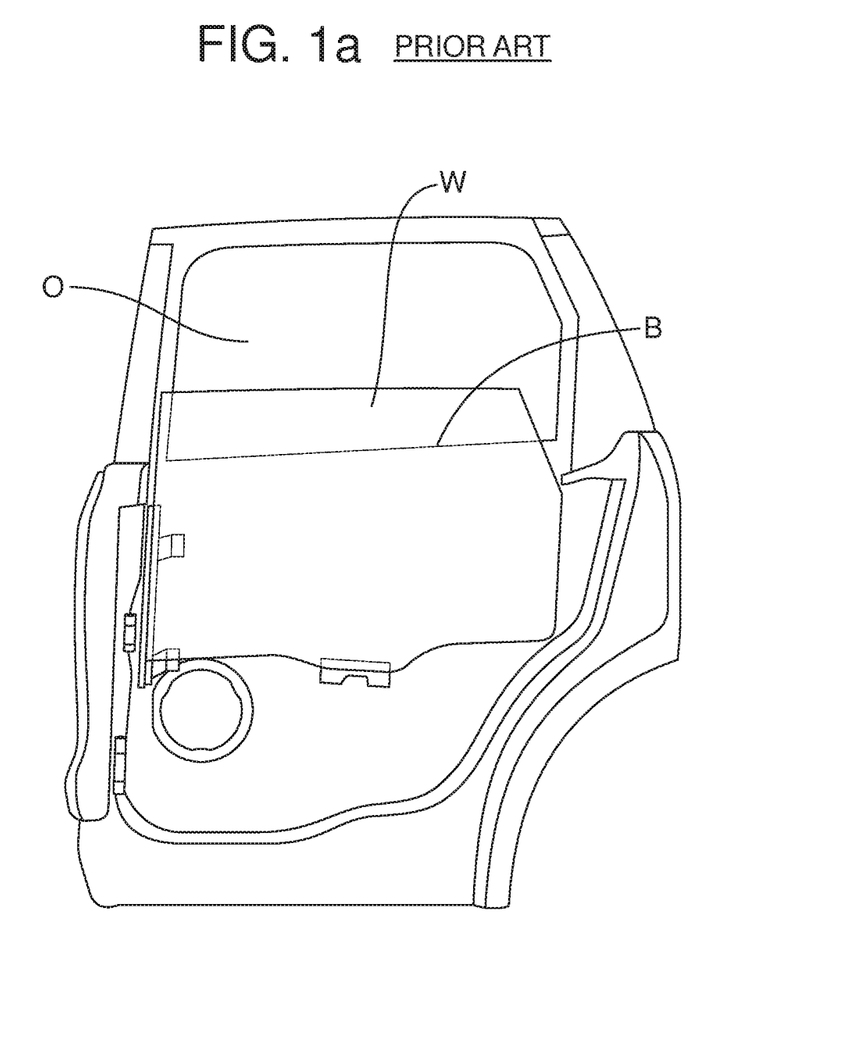
FIG. 1a illustrates one type of prior art compromise made when a door panel will not accommodate fully opening a full-size window or door glass.

In the past this problem has generally been resolved by one of two compromises. In the first of these compromises, illustrated in FIG. 1a, the window or door glass W does not drop completely below the belt line B found on the door at the lower side of the window frame. In this situation, the vehicle occupant does not have a comfortable place to rest his arm when the window is down. Further, there is only limited room to pass items through the opening O above the window and the portion of the opening remaining covered by the window significantly limits available ventilation.

Figure 1B:
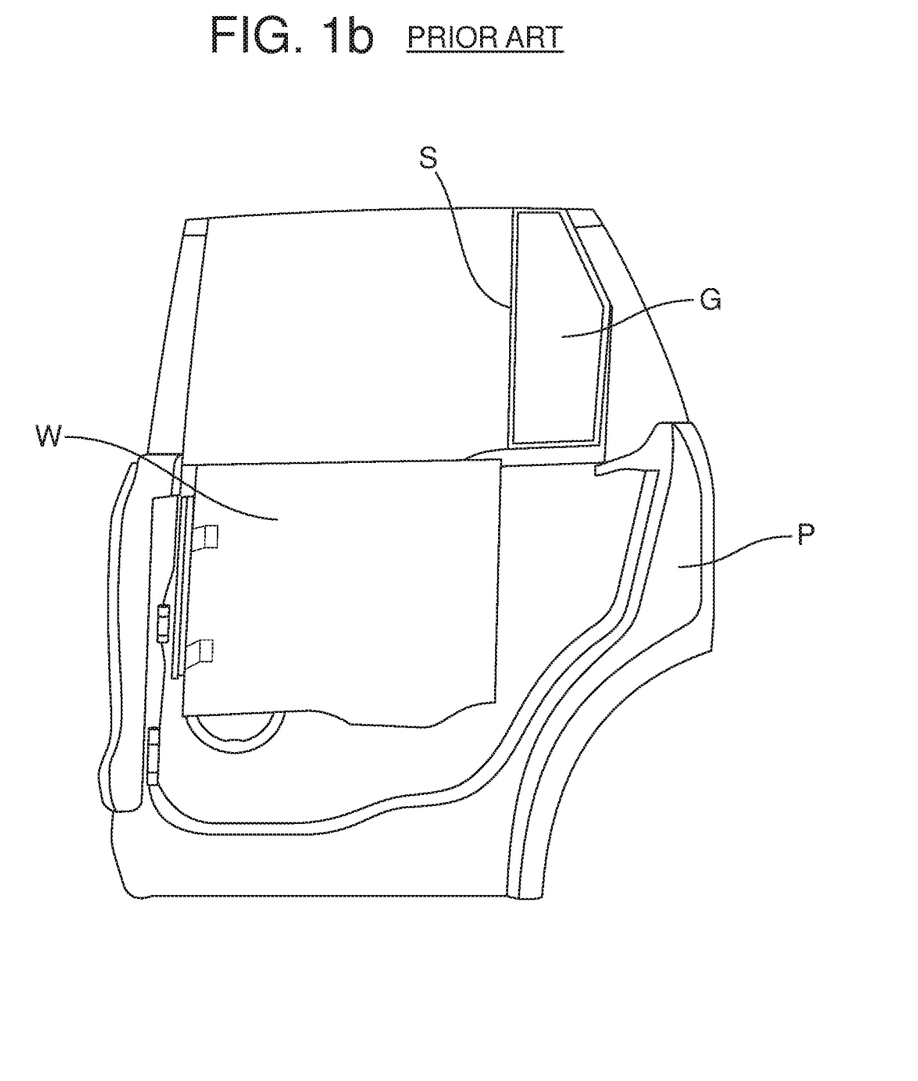
FIG. 1b illustrates a second type of prior art compromise when a door panel will not accommodate fully opening a full-size window or door glass.

In option number 2, illustrated in FIG. 1b, the size of the movable portion of the window or door glass W is reduced so that portion may be fully opened and dropped into the door panel P. Unfortunately, this compromise limits the size of the window opening above the door and increases the cost and complexity of the window system due to, for example, the addition of a fixed piece of glass G and the division bar seal S or an applique that blocks a portion of the daylight opening.

This document relates to a new and improved apparatus and method that allow the full lowering of a window and division bar into the door panel below the beltline while avoiding the compromises set forth above.

SUMMARY

In accordance with the purposes and benefits described herein, a new and improved apparatus is provided for fully lowering a window and a division bar into a door panel and providing a full window opening above the door panel. That apparatus includes (a) a door panel having an entry opening or window receiver and an internal compartment, (b) a window, (c) a division bar and (d) a regulator carried on the door panel. The regulator displaces the window and the division bar between a closed position projecting above the door panel from the entry opening and an opened position concealed within the internal compartment of the door panel.

The regulator may comprise a motor and a cable drive system concealed within the internal compartment of the door panel. The regulator may further include a first guide rail system for guiding the window as the window is displaced between the closed position and the opened position.

A pin may be carried on the window and a cooperating catch may be carried on the division bar. In one of many possible embodiments, the apparatus may include a tension spring having a first end connected to the division bar and a second end connected to the door. In such an embodiment the division bar may slide relative to the window between a first position when the window and the division bar are in the closed position and a second position when the window and the division bar are in the opened position. The tension spring may bias the division bar toward the second position. Further the pin may engage the catch when the window and the division bar are in the closed position. In addition, a stop may be provided on the door. That stop may engage the division bar when the division bar is in the opened position.

In yet another of the many possible embodiments, the apparatus may include a compression spring having a first end connected to the division bar and a second end connected to the door. In such an embodiment, the division bar may slide relative to the window between a first position when the window and the division bar are in the closed position and a second position when the window and the division bar are in the opened position. The compression spring may bias the division bar toward the first position. Further, the pin may engage the catch when the window and the division bar are in the opened position.

In accordance with yet another possible embodiment of the many possible embodiments, the apparatus may further include a guide track in the internal compartment of the door panel and at least one guide on the division bar engaging and sliding along that guide track. Further, the apparatus may include a spring having a first end connected to the division bar and a second end connected to the door. In such an embodiment the division bar may move relative to the window between a first position, when the window and the division bar are in the closed position, and a second position when the window and the division bar are in an opened position. The spring may function to bias the division bar toward the first position. Further, the apparatus may include a stop on the division bar. That stop engages an edge of the window when the window and the division bar are in the closed position.

In accordance with an additional aspect, a method is provided for fully lowering a window and a division bar in order to enjoy a full size window opening above a door panel. That method includes the steps of (a) displacing, by a regulator, a window and a division bar between a closed position projecting from an entry opening or window receiver in a door panel and an opened position concealed within an internal compartment of the door panel and (b) simultaneously displacing the division bar with respect to the window between a first position, when the window and the division bar are in the closed position, and a second position when the window and the division bar are in the opened position.

The method may further include the step of translating the division bar with respect to the window as the window and the division bar are being displaced between the closed position and the opened position. In addition, the method may include the step of providing a pin on the window and a catch on the division bar.

In one of many possible embodiments of the method, the method may further include the step of biasing, by a spring, the division bar toward the second position. In another of the many possible embodiments, the method may include the step of biasing, by a spring, the division bar toward the first position.

In yet another possible embodiment of the many possible embodiments of the method, the method may include the step of providing a guide track on the door panel and at least one guide on the division bar. Further, the method may include guiding the division bar along the guide track as the division bar is displaced between the first position and the second position.

Still further, the method may include the step of turning the division bar with respect to the window as the division bar is guided along the guide track as well as the step of biasing, by a spring, the division bar toward the first position. Still further, the method may include the step of engaging an edge of the window with a stop on the division bar when the window and the division bar are in the closed position.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

Reference will now be made in detail to the present preferred embodiments of the apparatus and method, examples of which are illustrated in the accompanying drawing figures.

DETAILED DESCRIPTION

Reference is now made to FIGS. 2a-2d illustrating a first possible embodiment of the new and improved apparatus 10 for fully lowering a window 12 and cooperating division bar 14 into a door panel 16 and providing a full-size opening 18 above the door panel.

The apparatus 10 includes the door panel 16 which has an entry opening or window receiver 20 along the top edge of the door panel which forms a belt line 22 for a motor vehicle.

The window 12 and the division bar 14 are carried on the door panel 16. A regulator 24 is carried in an internal compartment 26 of the door panel 16. As will be apparent from the following description, the regulator 24 displaces the window 12 and the division bar 14 between a fully raised or closed position illustrated in FIG. 2a wherein the window and division bar project above the door panel 16 through the window receiver 20, and an opened position, illustrated in FIG. 2d wherein the window and division bar are lowered below the top edge of the door panel 16 and belt line 22 of the motor vehicle and fully concealed within the internal compartment 26 of the door panel.

In the illustrated embodiment, the regulator 24 comprises a single motor 28 and cooperating drive cable 30 stretched over a series of pulleys 32, 34, 36, 38. The regulator 24 also includes a guide rail system comprising two guide rails 40. Two window lift brackets 42 connected to the window 12 slide along the guide rails 40 as the window 12 and the division bar 14 are displaced between the closed and opened positions by the drive motor 28. The window regulator 24 is fully illustrated in FIG. 2a but has been removed from FIGS. 2b-2d in order to more clearly illustrate the movement and operation of the window 12 and division bar 14.

As further illustrated in FIGS. 2a-2d, a pin 44 is carried on the window and a cooperating catch 46 is carried on the division bar 14. The apparatus 10 also includes a tension spring 48 having a first end 50 connected to the division bar 14 and a second end 52 connected to the door panel 16.

Figure 2A:
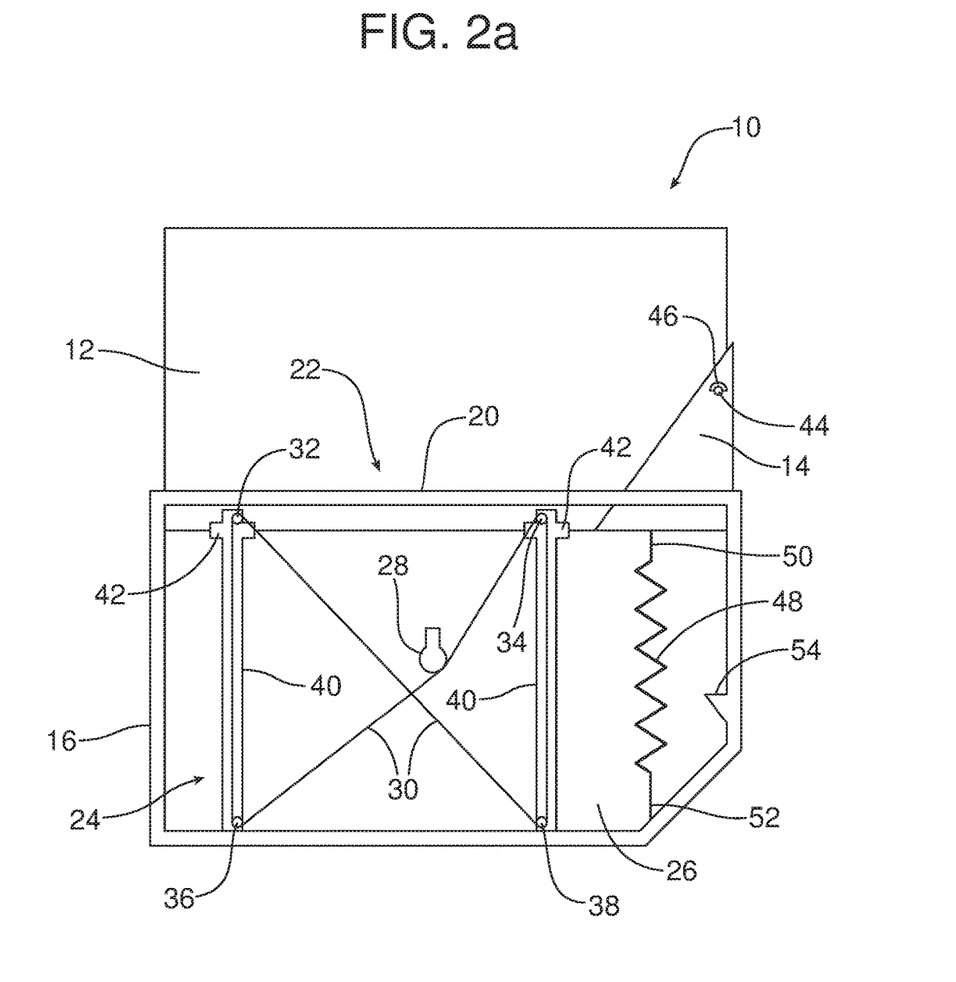
FIGS. 2a-2d are a series of schematic views illustrating one possible embodiment of the new and improved apparatus for fully opening a window and a division bar and providing a full opening above a door panel of a motor vehicle.
Figure 2B:
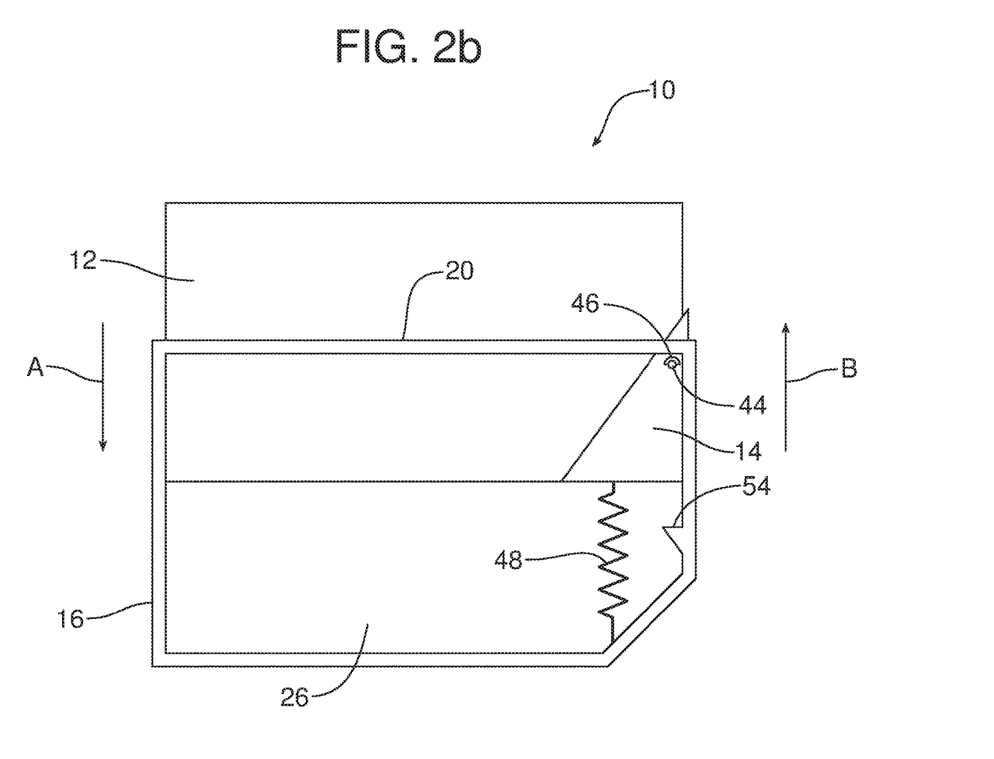
Figure 2C:
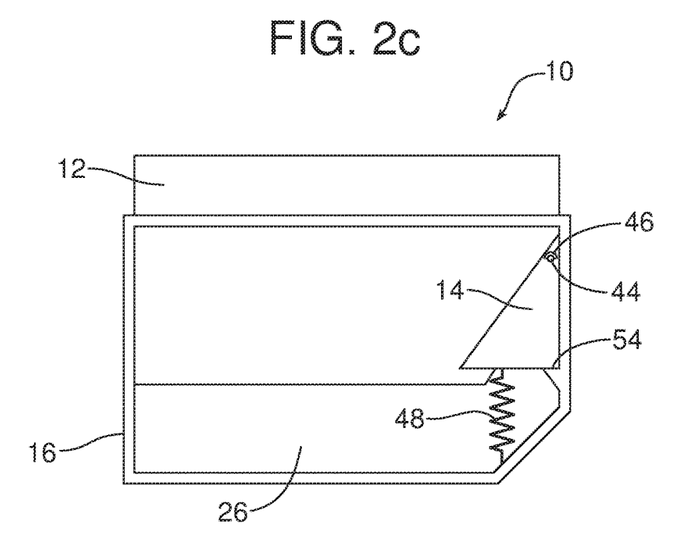
Figure 2D:
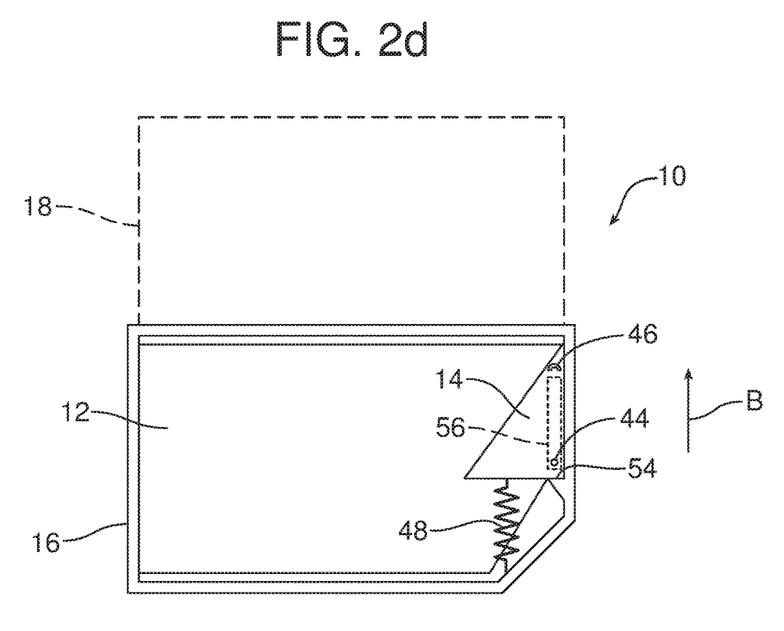

The division bar 14 slides relative to the window 12 between a first position, illustrated in FIG. 2a, when the window and the division bar are in the closed position and a second position illustrated in FIG. 2d when the window and the division bar are in the opened position. As should be appreciated, the tension spring 48 functions to bias the division bar 14 toward the second position.

As illustrated in FIG. 2a, when the window 12 and division bar 14 are fully raised and in the closed position, the pin 44 on the window 12 is engaged with the catch 46 on the division bar 14. As illustrated in FIG. 2b, as the window 12 and division bar 14 are initially being lowered and moved toward the opened position, the window 12 and division bar 14 travel downward together in the direction of action arrow A.

As illustrated in FIG. 2c, once the window 12 and division bar 14 have been lowered sufficiently to drop the top end of the division bar through the window receiver 20 below the belt line 22 of the door panel 16, the second edge of the division bar engages the stop 54 provided on the door panel 16. Due to the contact between the division bar 14 and the stop 54, further lowering of the division bar 14 is prevented but the regulator 24 still continues to lower the window 12 in the direction of action arrow A until the top edge of the window passes through the window receiver 20 below the belt line 22 of the motor vehicle. Thus, once the window 12 and division bar 14 have been fully lowered into the opened position, both the window 12 and the division bar 14 are fully concealed within the internal compartment 26 of the door panel 16 as illustrated in FIG. 2d. In this position, the pin 44 on the window 12 has moved away from the catch 46 on the division bar 14. As illustrated in FIG. 2d, the division bar 14 may include an optional channel 56 below the catch 46 to allow for passage of the pin 44. As should be appreciated, the tension spring 48 functions to hold the division bar 14 against the stop 54 once the division bar 14 has been fully lowered.

The regulator 24 may also be utilized to raise the window 12 and division bar 14 from the fully opened position illustrated in FIG. 2d to the fully closed position illustrated in FIG. 2a. Initially, the regulator 24 displaces only the window 12 upward in the direction of action arrow B. See FIGS. 2c and 2d. However, once the pin 44 on the window 12 engages the catch 46 on the division bar 14, the window 12 and division bar 14 are both raised together in the direction of action arrow B (note FIG. 2b) until the window 12 and division bar 14 are fully raised and in the closed position projecting through the window receiver 20 above the door panel 16 and fully closing out the window opening 18 above the door panel 16.

Reference is now made to FIGS. 3a-3d illustrating an alternative embodiment of the apparatus designated by reference numeral 10'. The apparatus 10' illustrated in FIGS. 3a-3d differs from the apparatus 10 illustrated in FIGS. 2a-2d by replacing the tension spring 48 with a compression spring 58, repositioning the catch 46 on the division bar 14 at the bottom rear corner instead of the top rear corner and deleting the stop 54. The remainder of the structure of the apparatus 10' is identical to the apparatus 10. As such, those components will not be separately described for brevity of description but will be identified by the same reference numbers. In the apparatus 10' illustrated in FIGS. 3a-3d, the division bar 14 slides relative to the window 12 between a first position when the window 12 and the division bar 14 are in the closed position illustrated in FIG. 3a and a second position when the window 12 and the division bar 14 are in the opened position illustrated in FIG. 3d.

Figure 3A:
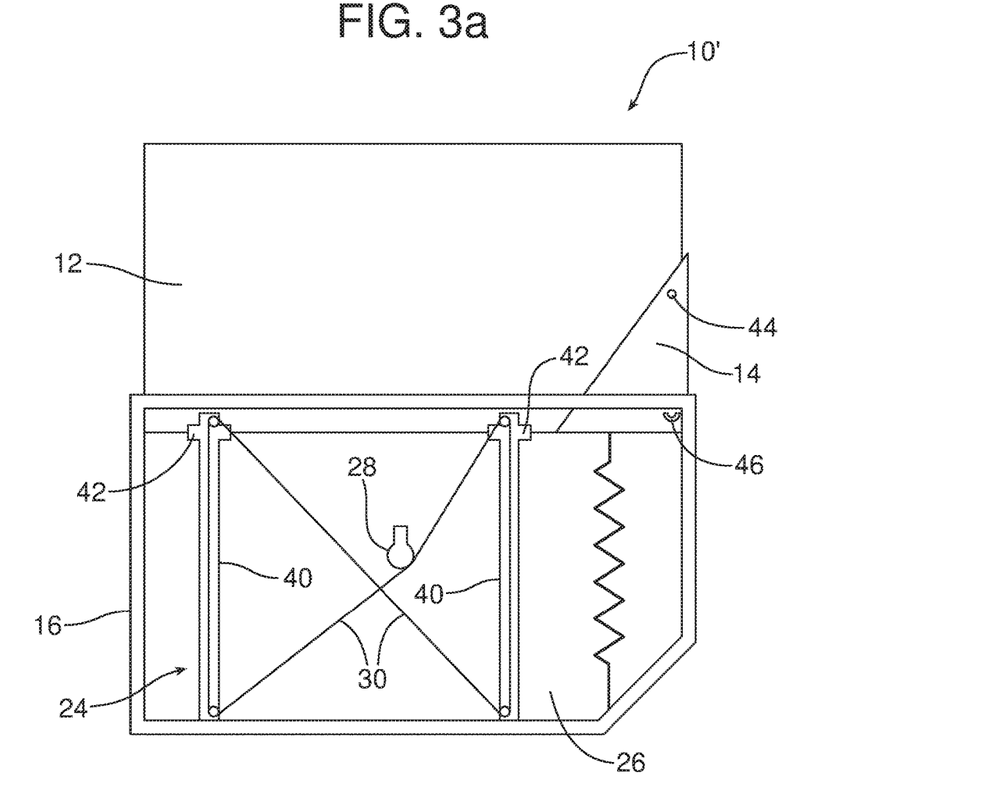
FIGS. 3a-3d are a series of schematic illustrations of a second possible embodiment of such an apparatus.
Figure 3B:
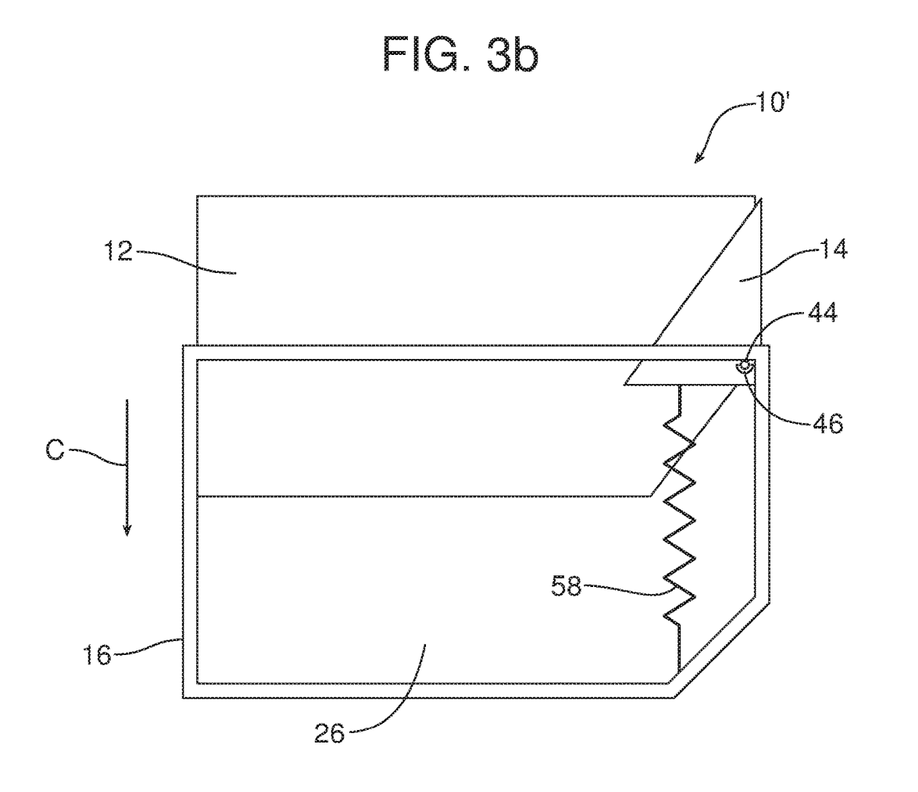
Figure 3C:
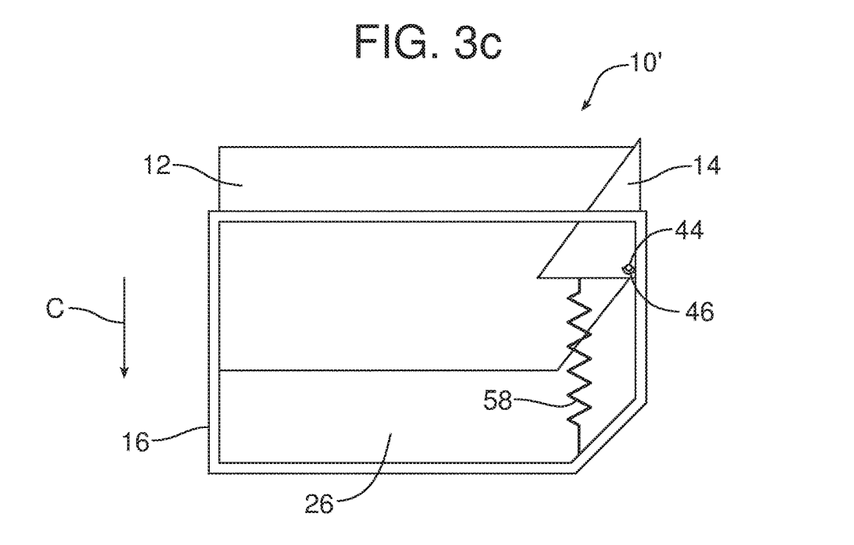
Figure 3D:
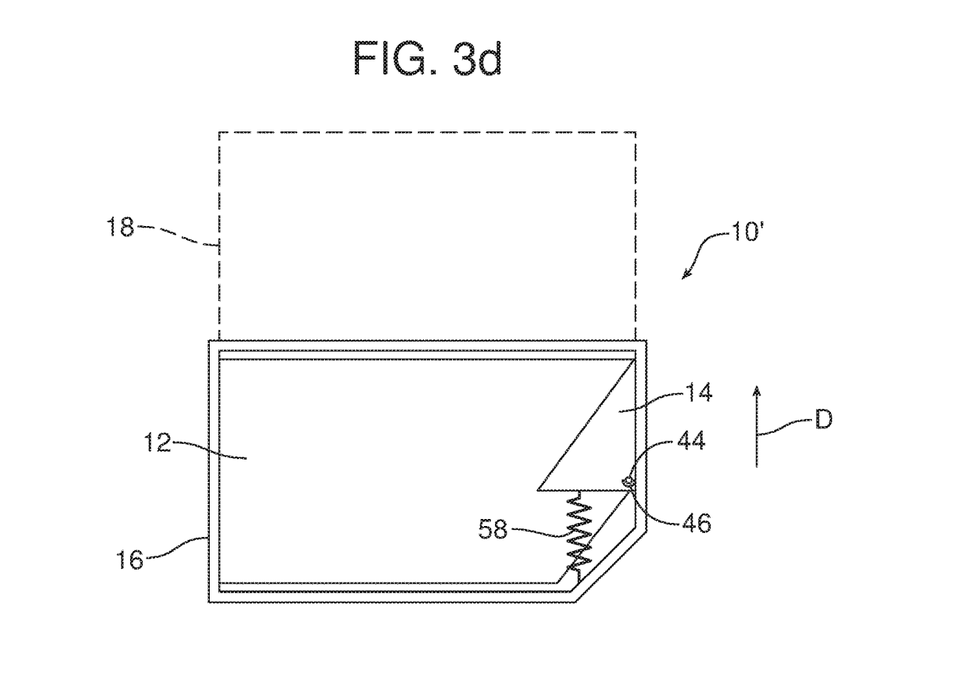

When the regulator 24 is activated to displace the window 12 and division bar 14 from the fully closed position illustrated in FIG. 3a to the fully opened position illustrated in FIG. 3d, the division bar 14 is initially held stationary by the biasing force of the compression spring 58 while the window 12 is first being lowered in the direction of action arrow C (see FIG. 3b). Thus, during the initial lowering of the window 12, the compression spring 58 functions to hold the division bar 14 in the first position. However, once the pin 44 on the window 12 engages the catch 46 at the bottom rear corner of the division bar 14, the window 12 and division bar 14 are lowered together in the direction of action arrow C through the window receiver 20 into the internal compartment 26 of the door panel 16 (see FIG. 3c). When fully opened, the window 12 and division bar 14 are both below the top edge of the door panel 16 and the belt line 22 of the motor vehicle where the window and division bar are fully concealed by the door panel inside the internal compartment 26.

When the regulator 24 is activated to displace the window 12 and division bar 14 from the fully opened position illustrated in FIG. 3d to the fully closed position illustrated in FIG. 3a, the regulator raises the window 12 while the compression spring 58 simultaneously biases the division bar 14 upward in the direction of action arrow D maintaining the catch 46 on the division bar 14 against the pin 44 on the window 12. Once the window 12 and division bar 14 reach the raised positions illustrated in FIG. 3b, the catch 46 engages the top edge/belt line 22 of the door panel 16 preventing further raising of the division bar 14 by the compression spring 58. However, window 12 continues to be raised by the regulator until the window 12 reaches the fully closed position illustrated in FIG. 3a.

Figure 4A:
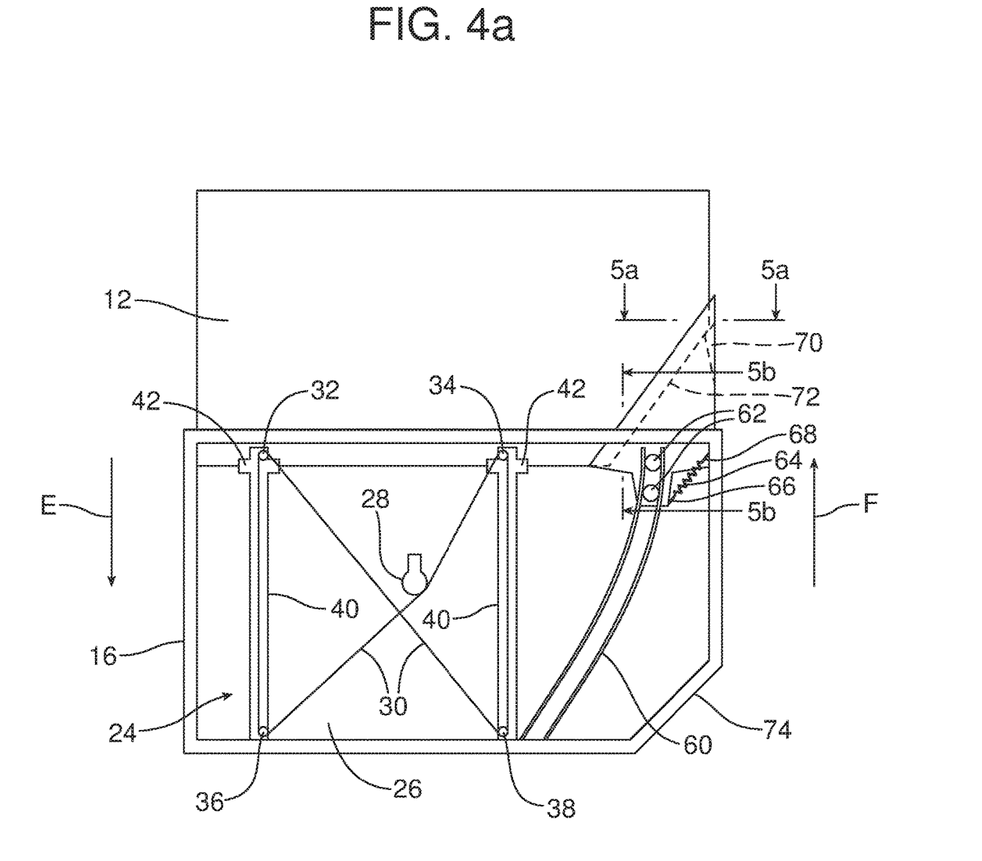
FIGS. 4a and 4b are two additional schematic illustrations of a third possible embodiment of such an apparatus.
Figure 4B:
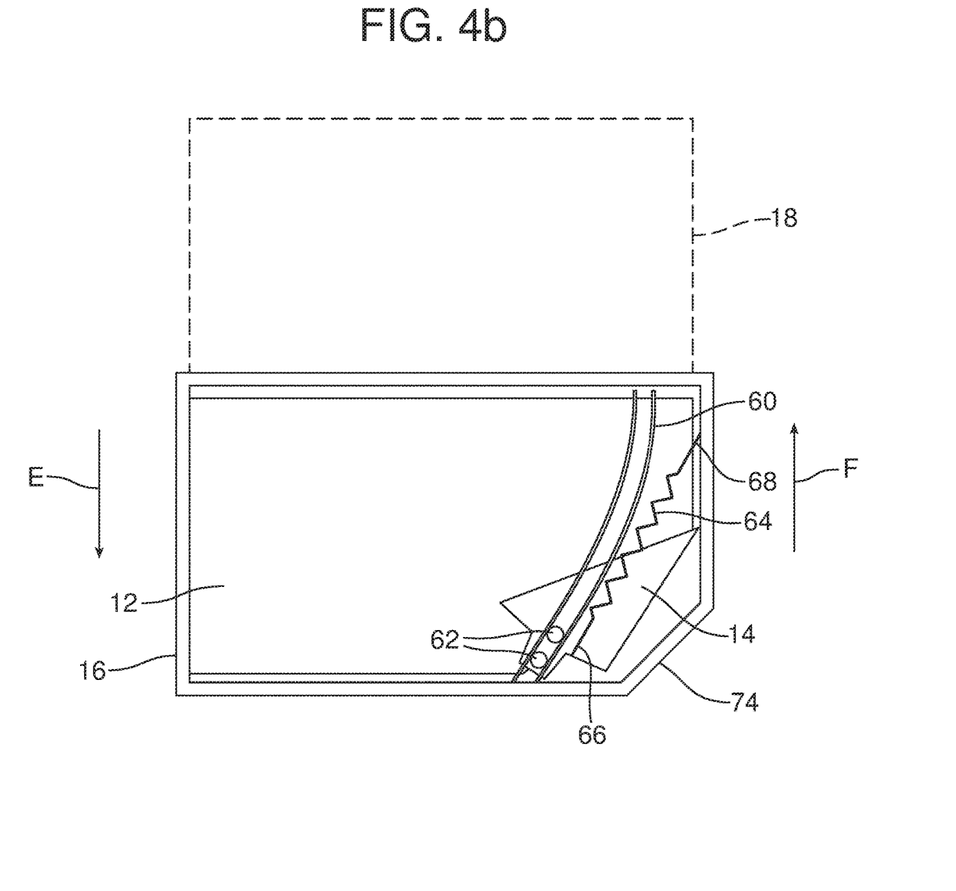

Reference is now made to FIGS. 4a and 4b illustrating yet another embodiment of the apparatus identified by reference number 10". As illustrated, the apparatus 10" includes a guide track 60 fixed to the door panel 16 and at least one guide 62 (two are illustrated in the drawing figure) carried on the division bar 14 and adapted to slide along the guide track 60. A spring 64 is connected between the division bar 14 and the door panel 16. In the illustrated embodiment, the spring 64 is a tension spring having a first end 66 connected to the division bar 14 and a second end 68 connected to the door panel 16.

As should be appreciated from reviewing FIGS. 4a and 4b, the division bar 14 moves relative to the window 12 between a first position illustrated in FIG. 4a when the window and the division bar 14 are in the closed position and as second position, illustrated in FIG. 4b when the window and division bar are in the opened position. The spring 64 functions to bias the division bar 14 toward the first position. A stop 70 on the division bar 14 engages an edge 72 of the window 12 when the window 12 and the division bar 14 are in the closed position.

In operation, as the regulator 24 displaces the window 12 and division bar 14 from the closed position illustrated in FIG. 4a to the opened position illustrated in FIG. 4b, the window 12 and division bar 14 are lowered together in the direction of action arrow E through the window receiver 20 at the top of the door panel 16 down into the internal compartment 26. As the division bar 14 is lowered the guides 62 follow the guide track 60 and the division bar 14 is turned relative to the window 12, accommodating the cutoff lower right-hand corner 74 of the door panel 16 and allowing the window 12 and division bar 14 to be fully lowered and concealed within the door panel 16 below the top edge/belt line 22 of the motor vehicle. This provides a fully open area 18 above the door panel 16. Significantly, the tension spring 64 maintains the stop 70 on the division bar 14 in contact with the first edge 72 of the window 12 at all times during the lowering process.

When the regulator 24 is utilized to displace the window 12 and division bar 14 from the fully opened position illustrated in FIG. 4b to the fully closed position illustrated in FIG. 4a, the regulator raises the window 12. The tension spring 64 serves to bias the division bar 14 upward in the direction of action arrow F so that the stop 70 is maintained in contact with the edge 72 of the window 12. As the division bar 14 is raised in the direction of action arrow F, the guides 62 travel along guide track 60 around the guide track corner and the division bar 14 is turned with respect to the window and again properly reoriented so that when fully raised and in the closed position the window 12 and division bar 14 function to seal the opening above the door panel 16.

Figure 5A:
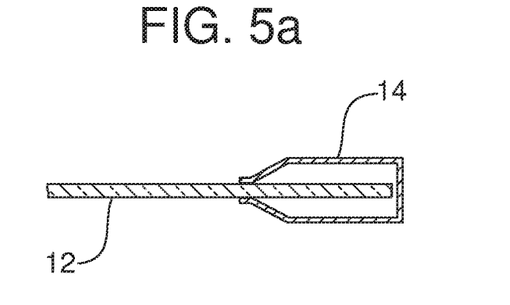
FIGS. 5a and 5b are respective cross-sectional views taken along lines 5a-5a and 5b-5b of FIG. 4a that illustrate the interface between the window and the division bar.
Figure 5B:
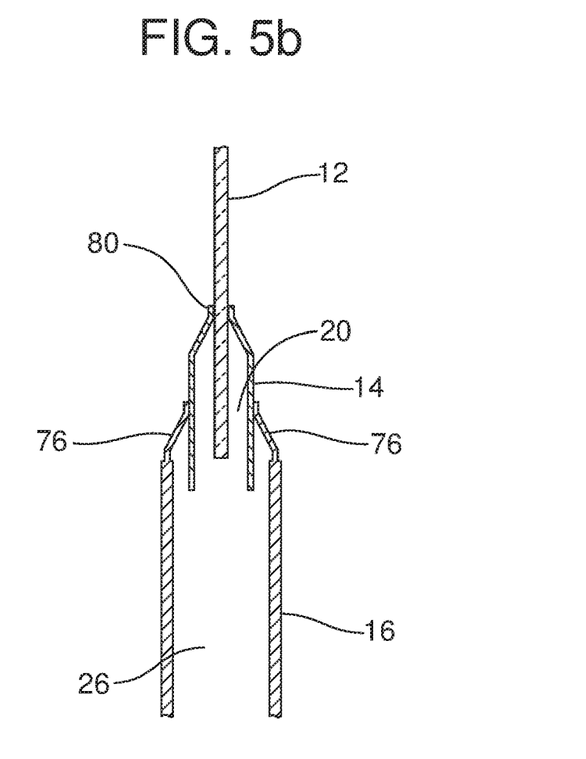

FIGS. 5a and 5b are schematic cross-sectional views taken along lines 5a-5a and 5b-5b of FIG. 4a and together illustrate the hollow interior of the division bar 14 that accommodates the turning movement. FIG. 5b also illustrates the window receiver 20 at the top edge of the door panel 16, the belt line seals 76 at the top edge of the door panel 16 which seal against the division bar 14 and the window 12. FIGS. 5a and 5b also illustrate the seal 80 between the window 12 and the division bar 14. In order to provide the seal 80, a low friction, long wearing material such as high density polyethylene or acetal may be required along the inside of the division bar 14 as the surface will always have pressure against the window 12.

The construction illustrated in FIGS. 5a and 5b for the third embodiment of the apparatus 10" may also be utilized for the second embodiment of the apparatus 10' and the first embodiment of the apparatus 10 if desired.

Consistent with the above description, a method is provided for fully opening and closing a window 12 and division bar 14 above a door panel 16. That method may be broadly described as including the steps of: (a) displacing, by the regulator 24, the window 12 and division bar 14 between a closed position projecting from a window receiver 20 in a door panel 16 (as illustrated in, for example, FIGS. 2*a*, 3*a* and 4*a*) and an opened position concealed within an internal compartment 26 of the door panel 16 (as illustrated in, for example, FIGS. 2*d*, 3*d* and 4*b*) and (*b*) simultaneously displacing the division bar 14 with respect to the window 12 between a first position when the window 12 and the division bar 14 are in the closed position and a second position when the window 12 and the division bar 14 are in the opened position. In the embodiments illustrated in FIGS. 2*a*-2*d* and 3*a*-3*d*, the method may include the step of translating the division bar 14 with respect to the window 12 as the window and the division bar are being displaced between the closed position and the opened position. Further, the method may include the step of providing a pin 44 on the window 12 and a catch 46 on the division bar 14.

In the embodiment illustrated in FIGS. 2*a*-2*d*, the method may include the additional step of biasing, by a spring 48, the division bar 14 toward the second position. In the embodiment illustrated in FIGS. 3*a*-3*d*, the method may include the step of biasing, by a spring 58, the division bar 14 toward the first position.

In the embodiment illustrated in FIGS. 4*a* and 4*b*, the method may include the step of providing the guide track 60 on the door panel 16 and more specifically within the internal compartment 26 of the door panel and at least one guide 62 on the division bar 14. Further, the method may include the step of guiding the division bar 14 along the guide track 60 as the division bar 14 is displaced between the first position and the second position. Additionally, the method may include the step of turning the division bar 14 with respect to the window 12 as the division bar (and, more specifically, the guide 62) is guided along the guide track 60.

Still further, as illustrated in FIGS. 4*a* and 4*b*, the method may include the additional step of biasing, by the spring 64, the division bar 14 toward the first position. In addition, the method may include the step of engaging an edge 72 of the window 12 with the stop 70 on the division bar 14 when the window 12 and the division bar 14 are at least in the closed position.

In summary, numerous benefits are provided by the various embodiments of the apparatus 10, 10', 10" and method for fully opening and closing the window 12 and the division bar 14 of the door panel 16. Advantageously, the apparatus 10, 10', 10" and the method allow a user to conveniently enjoy the full benefits of the entire open area 18 above the door panel 16 with both the window 12 and division bar 14 being fully concealed within the internal compartment 26 of the door panel 16 below the belt line 22 of the motor vehicle when in the fully opened position. Further, it should be appreciated that the window 12 and division bar 14 are displaced between the fully closed and fully opened positions simultaneously and by means of a regulator 24 incorporating a single drive motor 28. Thus, all embodiments of the apparatus 10, 10', 10" have a relatively simple construction that is easy to manufacture and assemble, is relatively inexpensive and provides a long service life.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a door panel having a window receiver and an internal compartment;
   a window;
   a division bar; and
   a regulator carried on said door panel, said regulator displacing said window and said division bar between a closed position projecting from said window receiver and an opened position concealed within said internal compartment wherein said regulator comprises a motor and cable drive system concealed within said internal compartment, wherein said regulator further includes a guide rail system guiding said window as said window is displaced between said closed position and said opened position, wherein a pin is carried on said window and a catch is carried on said division bar and wherein said apparatus further includes a tension spring having a first end connected to said division bar and a second end connected to said door panel.

2. The apparatus of claim 1, wherein said division bar slides relative to said window between a first position when said window and said division bar are in said closed position and a second position when said window and said division bar are in said opened position.

3. The apparatus of claim 2, wherein said tension spring biases said division bar toward said second position.

4. The apparatus of claim 3, wherein said pin engages said catch when said window and said division bar are in said closed position.

5. The apparatus of claim 4, further including a stop on said door panel, said stop engaging said division bar when said division bar is in said opened position.

6. The apparatus of claim 1, further including a compression spring having a first end connected to said division bar and a second end connected to said door panel.

7. The apparatus of claim 6, wherein said division bar slides relative to said window between a first position when said window and said division bar are in said closed position and a second position when said window and division bar are in said opened position.

8. The apparatus of claim 7, wherein said compression spring biases said division bar toward said first position.

9. The apparatus of claim 8, wherein said pin engages said catch when said window and said division bar are in said opened position.

10. An apparatus, comprising:
    a door panel having a window receiver and an internal compartment;
    a window;
    a division bar; and
    a regulator carried on said door panel, said regulator displacing said window and said division bar between a closed position projecting from said window receiver and an opened position concealed within said internal compartment wherein said regulator comprises a motor and cable drive system concealed within said internal compartment, wherein said regulator further includes a guide rail system guiding said window as said window is displaced between said closed position and said opened position and wherein said apparatus further includes a guide track in said internal compartment, at least one guide on said division bar engaging and sliding along said guide track and a spring having a first end connected to said division bar and a second end connected to said door panel.

11. The apparatus of claim 10, wherein said division bar moves relative to said window between a first position when said window and said division bar are in said closed position and a second position when said window and said division bar in said opened position.

12. The apparatus of claim 11, wherein said spring biases said division bar toward said first position.

13. The apparatus of claim 12, further including a stop on said division bar, said stop engaging an edge of said window when said window and said division bar are in said closed position.

* * * * *